Figure 1:
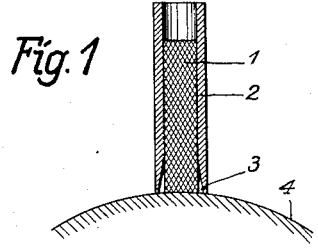

Patented Jan. 13, 1942

2,269,614

UNITED STATES PATENT OFFICE 2,269,614

SLIDING CURRENT COLLECTOR FOR SLIP RINGS

Ekart Graf von Soden, Friedrichshafen, Bodensee, Germany, assignor to Zahnradfabrik Friedrichshafen Aktiengesellschaft, Friedrichshafen-on-the-Bodensee, Germany Application July 21, 1939, Serial No. 285,740
In Germany July 30, 1938

9 Claims. (Cl. 171—325)

This invention relates to current collectors and the invention consists in that the current collector (brush or the like) and the oil scraper member are both arranged adjacent each other as current conducting members and are united to form a single unit.

In this way, there is obtained an important advantage that the layer of oil on the slip ring is scraped off directly in front of the point at which the current collector must contact completely with the slip ring and, in this way, a good dry contact and, therefore, efficient passage of current is possible.

A further advantage consists in that the current collector is of particularly simple construction and can be exchanged as a whole (in the same way as a normal current collecting brush) and, if necessary, may be made entirely of a uniformly good conducting material. In addition, there is, in all the possible forms of construction within the scope of the invention, a sufficiently large total contacting surface between the current collector and the slip ring.

The drawing illustrates several examples of construction of the invention.

Figure 2:
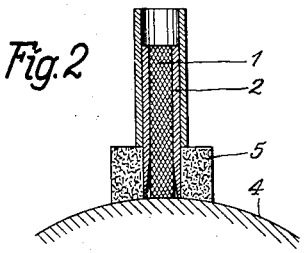
Figure 3:
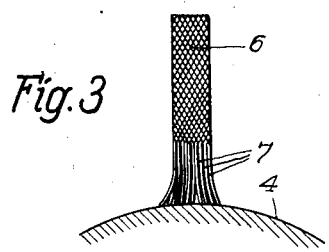
Figure 4:
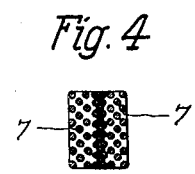
Figure 5:
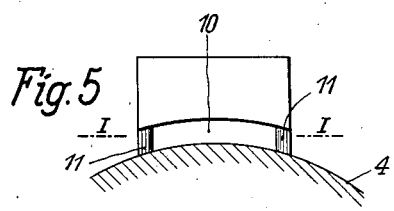
Figure 7:
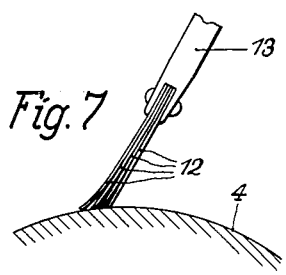
Figure 6:
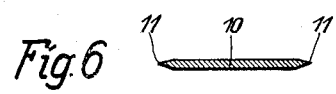
Figure 8:
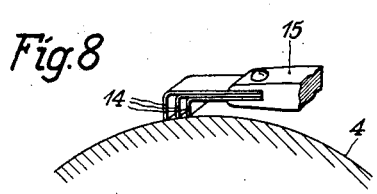
Figure 9:
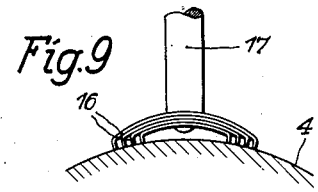

Fig. 1 shows a longitudinal section of a substantially tubular current collector, Fig. 2 shows a modified construction of a similar tubular current collector, Fig. 3 shows the special formation of metal gauze or the like as a current collector, Fig. 4 is a possible cross section of a current collector according to Fig. 3, Fig. 5 shows a current collector constructed in the form of narrow strips, Fig. 6 is a section on line I—I of Fig. 5, Fig. 7 shows a current collector made of several sliding plates, Fig. 8 shows a current collector in the form of a scraper, and Fig. 9 shows a further scraper-like construction of the current collector.

Reference to the examples of construction illustrated will make it clear that various means for scraping or wiping off the layer of oil on the slip ring may be employed according to the invention.

In the example of construction according to Fig. 1, a metal gauze member 1 (for example a pressed gauze roll) is enclosed by a sleeve 2 which is chamfered at the edge 3 resting on the slip ring 4 so that the lower edge stands laterally away from the inner metal gauze leaving a space between the gauze and the edge of the sleeve. The edge portion 3 of the sleeve, which lies in the front against the direction of rotation of the slip ring 4, acts in the manner of a scraper to remove and scrape off the oil so that the metal gauze 1, which rests on the slip ring with the necessary cross sectional surface, contacts with this ring in an oil-free condition. The sleeve 2 is preferably formed of metal and conductively united with the metal gauze 1 in order to act as a conductive current collector. The metal gauze 1 as well as the sleeve 2 are preferably of rounded cross section.

The current collector according to Fig. 1 may be additionally modified as shown in Fig. 2 by providing additional oil scraping means, for example, a felt ring 5 on the outside of the sleeve 2.

Another form of construction of the current collector may consist, as shown, for example in Figure 3, of the metal gauze member 6 with several individual wires 7 on which the slip ring rests, whilst the wires 7 are not in contact with each other over a certain length at the bottom. Of these individual wires, those which are in the front against the direction of rotation of the slip ring serve as oil scrapers. They remove the layer of oil in order to provide an oil-free contact for the transfer of current for the rear wires. The current collector can also be constructed as, for example, according to Figure 4, so that only the outer wires 7 in both directions of rotation of the slip ring are not in contact with each other whilst the central wires contact with each other over the necessary narrow cross section required for the transfer of current or the middle part may be in the form of a single metal member which contacts with the slip ring over its large cross sectional surface and thus forms the main current conducting member.

It is also possible to provide a one-piece metal member as a current collector which, as shown in Figs. 5 and 6, forms the narrow metal strip 10 which over its entire length contacts with the slip ring as a ring part. The ends of the strip are preferably narrowed to form cutting edges 11. The front part of the metal strip acts to disperse the layer of oil on the slip ring whilst the greatest part of the contacting surface of the strip acts as a contacting current collector. The strip may be interrupted over its length so that the slip ring does not contact with the strip at one or more points.

A further form of construction of the current collector according to the invention, as shown in Fig. 7, consists in that several metal strips 12 are arranged one behind the other in the direction of rotation of the slip ring and in such a way that the separate strips do not contact with each other at their ends which rest on the slip ring. The strips are so chosen as regards their number and cross section that the front strip itself effects an efficient removal of the layer of oil and, in this way, the necessary oil-free contact for the production of an efficient transfer of current is effected. The metal strips 12 are held in a suitable manner in a holder 13.

A form of construction of current collector similar to that shown in Fig. 7 is shown in Fig. 8. In this case, scraper-like bent metal sheets 14 are provided, the ends of which are arranged at suitable intervals behind each other on the slip ring. These metal sheets are held in a holder 15. The action of the current collector is the same as that according to Fig. 7.

The current collector provided with scraper-like metal sheets may also be constructed as a double member as shown in Fig. 9. In this case, there are several metal strips 16 which are bent over in two places and are fixed in a holder 17.

There are still further possible forms of construction within the scope of the invention and, in particular, several of the forms illustrated can be used in combination.

Insofar as the current collector consists of several sheets, these sheets may have an angular cross section and be so arranged that the apex is always directed forwards against the direction of rotation of the slip ring. In this way, the foremost sheet may be broader in order to provide a completely dry path for the succeeding narrower sheets.

In all forms of construction of the current collector, the slip ring may be of any construction and may be cylindrical or be provided, for example, with oblique portions which enable the oil to be thrown off during rotation.

I claim:

1. In a current collector for use with oil-coated slip rings the combination of: conductive brush means and means for wiping the rotating contact slip ring, said wiping means also consisting of conductive material and both means being arranged close to each other and combined to form a single unit having a ring-contacting portion composed entirely of conductive material.

2. In a current collector for use with oil-coated slip rings, the combination of: conductive brush means and means, comprising a series of scraper-like blades spaced from each other in the direction of rotation of the rotating contact slip ring, for wiping said slip ring, said wiping means consisting of conductive metal and both means being arranged close to each other and combined to form a single unit having a ring-contacting portion composed entirely of conductive material.

3. In a current collector for use with oil-coated slip rings, the combination of: conductive brush means and means, comprising a plurality of individual wires having open spaces between them at the point of contact, for wiping said slip ring, said wiping means consisting of conductive metal and both means being arranged close to each other and combined to form a single unit having a ring-contacting portion composed entirely of conductive material.

4. In a current collector for use with oil-coated slip rings the combination of: conductive brush means and wiping means also of conductive material arranged close to each other and combined to form a single conductive body, comprising a metal blade of segmental shape extending over the rotating contact slip ring in the direction of rotation and tapering at its ends for wiping said slip ring.

5. In a current collector for use with oil-coated slip rings, the combination of: a conductive brush means; and a sleeve member surrounding said brush means for scraping the oil from the rotating contact slip ring, said sleeve member being bevelled at its border so as to be spaced from the inner brush means, and said brush means and said sleeve being arranged close to each other and united to form a single body.

6. In a current collector for use with oil-coated slip rings, the combination of: a conductive brush means; a sleeve member surrounding said brush means; said sleeve member being bevelled on its border so as to be spaced from the inner brush means; and an oil wiping ring connected to the outer surface of the sleeve piece, said brush means and said sleeve being arranged close to each other and being combined to form a single unit.

7. A current collector for use with oil-coated slip rings comprising a conductive brush having associated means for wiping the rotating contact slip ring, said wiping means also consisting of conductive material and forming with said brush a single unit having a ring-contacting surface composed entirely of conductive material.

8. A current collector for use with oil-coated slip rings comprising a conductive brush having a plurality of slip ring contacting surfaces, said contacting surfaces being formed of conductive material capable of simultaneously wiping the oil-coated slip ring and conducting current therefrom, said contacting surfaces having an open space between them at their point of contact with the slip ring, but being in contact with each other at a point removed from the point of contact with the slip ring to provide a single conductive body.

9. In a current collector for use with oil-coated slip rings, the combination of: a conductive brush means; and a sleeve member surrounding said brush means having a wiping end portion for scraping oil from the rotating contact slip ring, said brush means and said sleeve being arranged close to each other and united to form a single conductive body.

EKART GRAF v. SODEN.